(12) United States Patent
Gutierrez

(10) Patent No.: US 11,071,990 B1
(45) Date of Patent: Jul. 27, 2021

(54) NOZZLE WITH A RANDOM DISCHARGE JET PATTERN

(71) Applicant: Vivid Creative Aquatics, LLC, Phoenix, AZ (US)

(72) Inventor: Antonio Gutierrez, Phoenix, AZ (US)

(73) Assignee: Vivid Creative Aquatics, LLC

( * ) Notice: Subject to any disclaimer, the term of this patent is extended or adjusted under 35 U.S.C. 154(b) by 373 days.

(21) Appl. No.: 16/151,073

(22) Filed: Oct. 3, 2018

Related U.S. Application Data

(60) Provisional application No. 62/568,698, filed on Oct. 5, 2017.

(51) Int. Cl.
| | |
|---|---|
| *B05B 1/00* | (2006.01) |
| *B05B 1/26* | (2006.01) |
| *B05B 1/02* | (2006.01) |
| *A01K 63/04* | (2006.01) |
| *B05B 1/34* | (2006.01) |

(52) U.S. Cl.
CPC ............... *B05B 1/262* (2013.01); *B05B 1/02* (2013.01); *A01K 63/04* (2013.01); *B05B 1/34* (2013.01)

(58) Field of Classification Search
CPC ........... B05B 1/262; B05B 1/02; A01K 63/04; A01K 63/042; B01F 5/08; B01F 11/0208
See application file for complete search history.

(56) References Cited

U.S. PATENT DOCUMENTS

| | | | | | |
|---|---|---|---|---|---|
| 1,273,685 | A | * | 7/1918 | Smiedel ................. | B05B 1/262 239/396 |
| 1,367,769 | A | * | 2/1921 | Coffey ................. | B05B 1/3447 239/488 |
| 1,380,950 | A | * | 6/1921 | Fornwalt ................. | B05B 1/02 251/340 |
| 4,681,263 | A | * | 7/1987 | Cockman ............... | B05B 1/262 239/391 |

* cited by examiner

*Primary Examiner* — Anshu Bhatia
(74) *Attorney, Agent, or Firm* — Thomas W. Galvani, P.C.; Thomas W. Galvani

(57) ABSTRACT

A nozzle with a random discharge jet pattern includes an intake cone having an upstream end, a downstream end, and an outer surface. The nozzle includes a bell with an upstream end, a downstream end, and an inner surface. The bell is fixed to the intake cone so that the upstream end of the bell encircles the downstream end of the intake cone. Vanes couple the bell to the intake cone, and the vanes extend from the outer surface of the intake cone to the inner surface of the bell and then along the inner surface of the bell toward the downstream end thereof. The vanes define a plurality of channels extending along the inner surface of the bell from the upstream end toward the downstream end thereof.

21 Claims, 12 Drawing Sheets

NOZZLE WITH A RANDOM DISCHARGE JET PATTERN

CROSS-REFERENCE TO RELATED APPLICATIONS

This application claims the benefit of U.S. Provisional Application No. 62/568,698, filed Oct. 5, 2017, which is hereby incorporated by reference.

FIELD OF THE INVENTION

The present invention relates generally to nozzles, and more particularly to water and fluid nozzles for use in fluid environments.

BACKGROUND OF THE INVENTION

Aquariums are artificial environments intended to replicate or condense real-world aquatic environments. Most aquariums have a water circulation system, a necessary evil in environments which are without the water volume and life mass of something like a lake or ocean. The circulation of water brings oxygen to flora and fauna within the aquarium and allows debris to be removed therefrom.

The manner in which water is circulated in an aquarium has an effect on the life within it. Some animals, such as coral, benefit from a random flow of water. Conventional circulation systems use return nozzles that simply discharge water directly out, creating very linear and uniform flow patterns within the aquarium. Coral can fail to thrive in these environments, because they poorly imitate the currents, tides, waves and other unpredictable movements of water that coral experience in the ocean. Other conventional nozzles have mechanical systems or gearing to cyclically rotate and direct water in different directions. However, these systems have a number of issues. The parts create noise, heat, and friction. Eventually, they wear down and must be replaced. Typically, they are complex designs and are thus not inexpensive to install and replace. An improved way to more randomly direct fluid within an aquatic environment is needed.

SUMMARY OF THE INVENTION

A nozzle with a random discharge jet pattern includes an intake cone having an upstream end, a downstream end, and an outer surface. The nozzle includes a bell with an upstream end, a downstream end, and an inner surface. The bell is fixed to the intake cone so that the upstream end of the bell encircles the downstream end of the intake cone. Vanes couple the bell to the intake cone, and the vanes extend from the outer surface of the intake cone to the inner surface of the bell and then along the inner surface of the bell toward the downstream end thereof. The vanes define a plurality of channels extending along the inner surface of the bell from the upstream end toward the downstream end thereof. When motive fluid moves through the nozzle, environmental fluid is pulled into the channels of the nozzle at the upstream end of the bell, and a central jet in the nozzle randomly pulls to different sides of the nozzle, creating a random fluid flow.

The above provides the reader with a very brief summary of some embodiments discussed below. Simplifications and omissions are made, and the summary is not intended to limit or define in any way the scope of the invention or key aspects thereof. Rather, this brief summary merely introduces the reader to some aspects of the invention in preparation for the detailed description that follows.

BRIEF DESCRIPTION OF THE DRAWINGS

Referring to the drawings.

DETAILED DESCRIPTION

Figure 1:
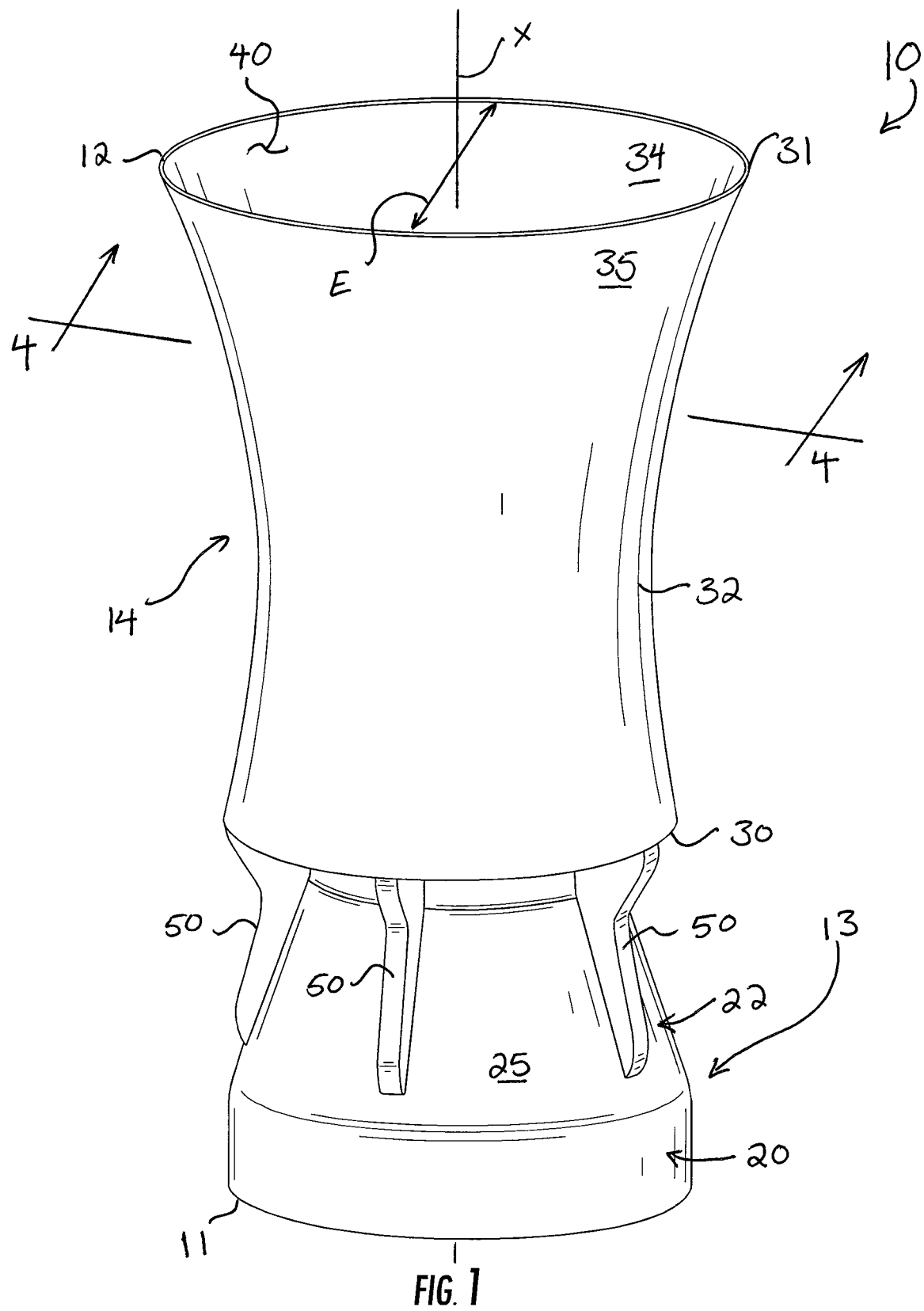
FIGS. 1 and 2 are top and bottom perspectives, respectively, of a nozzle with a random discharge jet pattern, showing an intake cone, a bell, and vanes extending therebetween.
Figure 2:
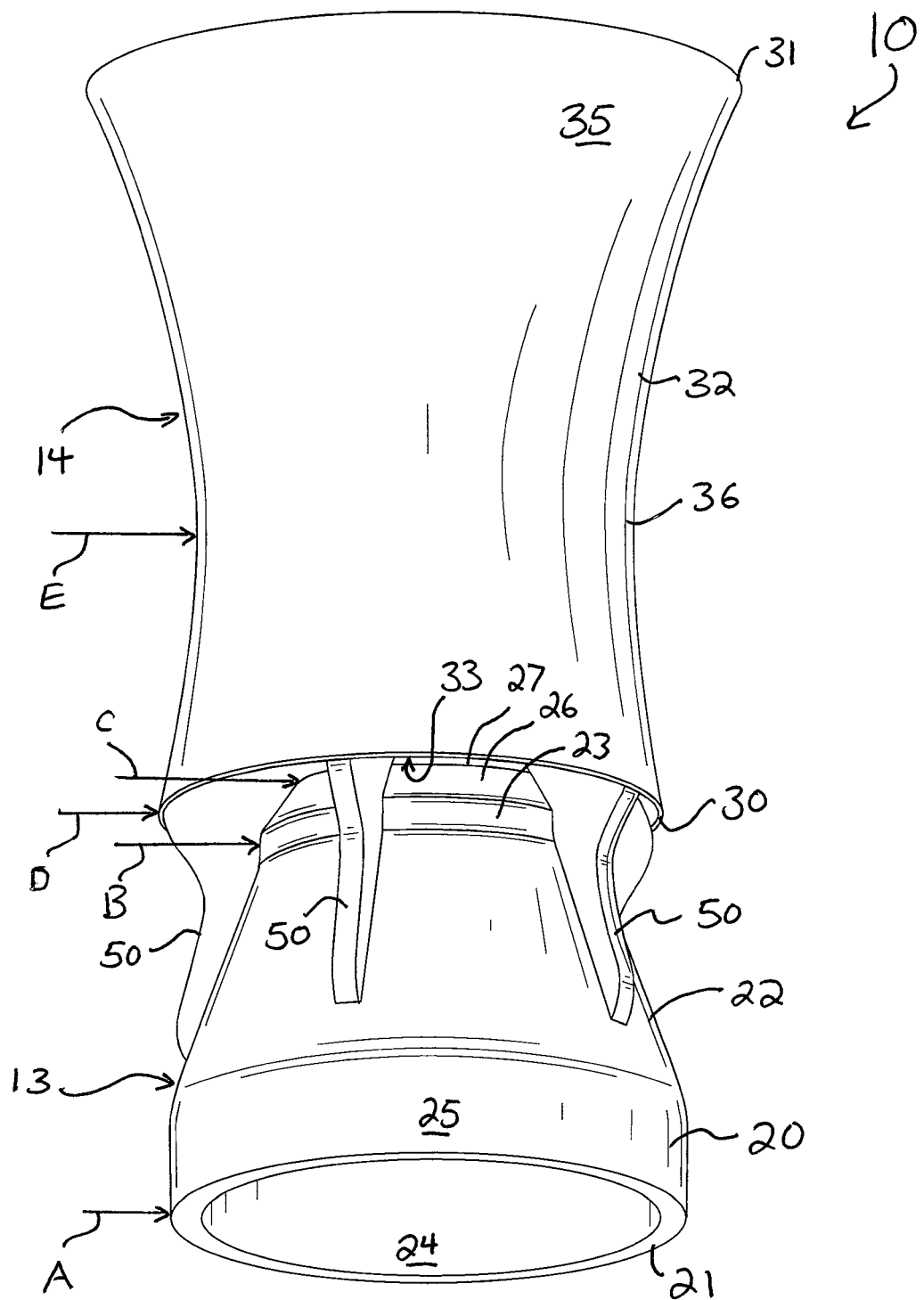

Reference now is made to the drawings, in which the same reference characters are used throughout the different figures to designate the same elements. FIGS. 1 and 2 illustrate a random discharge jet pattern nozzle 10 (hereinafter "nozzle 10"). The nozzle 10 has a generally cylindrical body with opposed upstream and downstream ends 11 and 12 and rotational symmetry with respect to a longitudinal axis X extending through the center of the nozzle 10 between the upstream and downstream ends 11 and 12. The nozzle 10 includes an intake cone 13 proximate to the upstream end 11 and a radially-spaced-apart bell 14 fixed to the intake cone 13 proximate to the downstream end 12. Briefly, it is noted here that the terms "upstream" and "downstream" identify locations or directions in the context of fluid flowing through the nozzle 10 from the intake cone 13 to the bell 14. The terms are used to identify absolute directions, relative directions, and relative positions of structural elements and features.

The intake cone 13 is configured to snug-fit onto the return or outlet pipe of a circulation system, such as a Loc-Line® hose, fitting, pipe, or the like. The intake cone 13 is roughly frustoconical in shape, having an annular base 20 defining an upstream end of the intake cone 13 and defining a circular open mouth or inlet 21 to the intake cone 13 at the upstream end 11 of the nozzle 10. The base 20 has a first diameter, which is constant along its axial length. The base 20 has an inner diameter which corresponds to the hose, fitting, pipe, or like structure in the circulation system, because the inner diameter of the base 20 fits onto and over that structure to couple the nozzle 10 to the circulation system. In some embodiments, an adhesive may be used between the base 20 and the circulation system structure to bond the two.

The base 20 is formed integrally to a first convergent cone 22, which tapers to a short, straight sidewall 23 and then a second convergent cone 26 defining an outlet 27. The first convergent cone tapes from an inner diameter A to an inner diameter B of the sidewall 23. Importantly, the diameters A and B are inner diameters; the arrowed lines shown in FIG. 2 which identify these diameters are meant to indicate their location on the nozzle 10. Even though the arrowed lines point to the outside of the nozzle 10, they indicate inner diameters, not outer diameters.

The inner diameter A corresponds to a structure in the circulation system to which the base 20 is fit, as discussed above. The inner diameter B is preferably less than the inner diameter A. In some embodiments, however, the inner diameters A and B may be the same diameter, and the cone 22 may actually by a straight cylinder.

The sidewall 23 is a short, straight cylindrical section of the intake cone 13. It extends from the downstream end of the cone 22 to the upstream end of the cone 26. The sidewall 23 maintains the inner diameter B along its entire axial length.

The second convergent cone 26 projects downstream from the sidewall 23. It tapers from the inner diameter B to a smaller inner diameter C, which is also the inner diameter of the outlet 27. The outlet 27 defines the downstream end of the intake cone 13. The diameter B is approximately ten percent larger than the diameter C. The diameter A is approximately two times larger than the diameter C. The diameter of the intake cone 13 decreases continuously from the inlet 21 to the outlet 27.

The intake cone 13 has opposed inner and outer surfaces 24 and 25, both of which are smooth, without bumps, indentations, or interruptions other than the changes in diameter (and the inflections caused by those changes in diameter), as the base 20 transitions to the cone 22, as the cone 22 transitions to the outlet 27, and on the outlet 27 itself. The entire intake cone 13 is formed from a single, integral, monolithic piece.

Fluid pumped through the circulation system is moved into the nozzle 10 smoothly at the intake cone 13 where it is constricted. This fluid is known as "motive fluid" and is contrasted with fluid already in the aquarium or other environment, herein identified as "environmental fluid". It is briefly noted that although this description refers to fluid primarily as water in the context of an aquarium, the nozzle 10 is not intended to be so limited. The nozzle 10 is useful with very small home aquariums, large commercial aquariums, and even very large educational and recreational parks and aquariums, such as those at SeaWorld® park, OdySea® aquarium, and other tourist and educational locations. Further, the nozzle 10 is useful in other water environments such as pools. Still further, the nozzle 10 is useful for mixing fluids other than water, such as in commercial kitchens, laboratories, processing plants, refineries, and in other industrial applications where a fluid is mixed. Yet still further, the nozzle 10 is useful in fluid, non-liquid environments, such as in environmental air. Such embodiments are suitable to distribute return air from an HVAC unit or to mix gases together. Nonetheless, this non-limiting description refers to a water environment because it is easily appreciated and understood.

Figure 11:
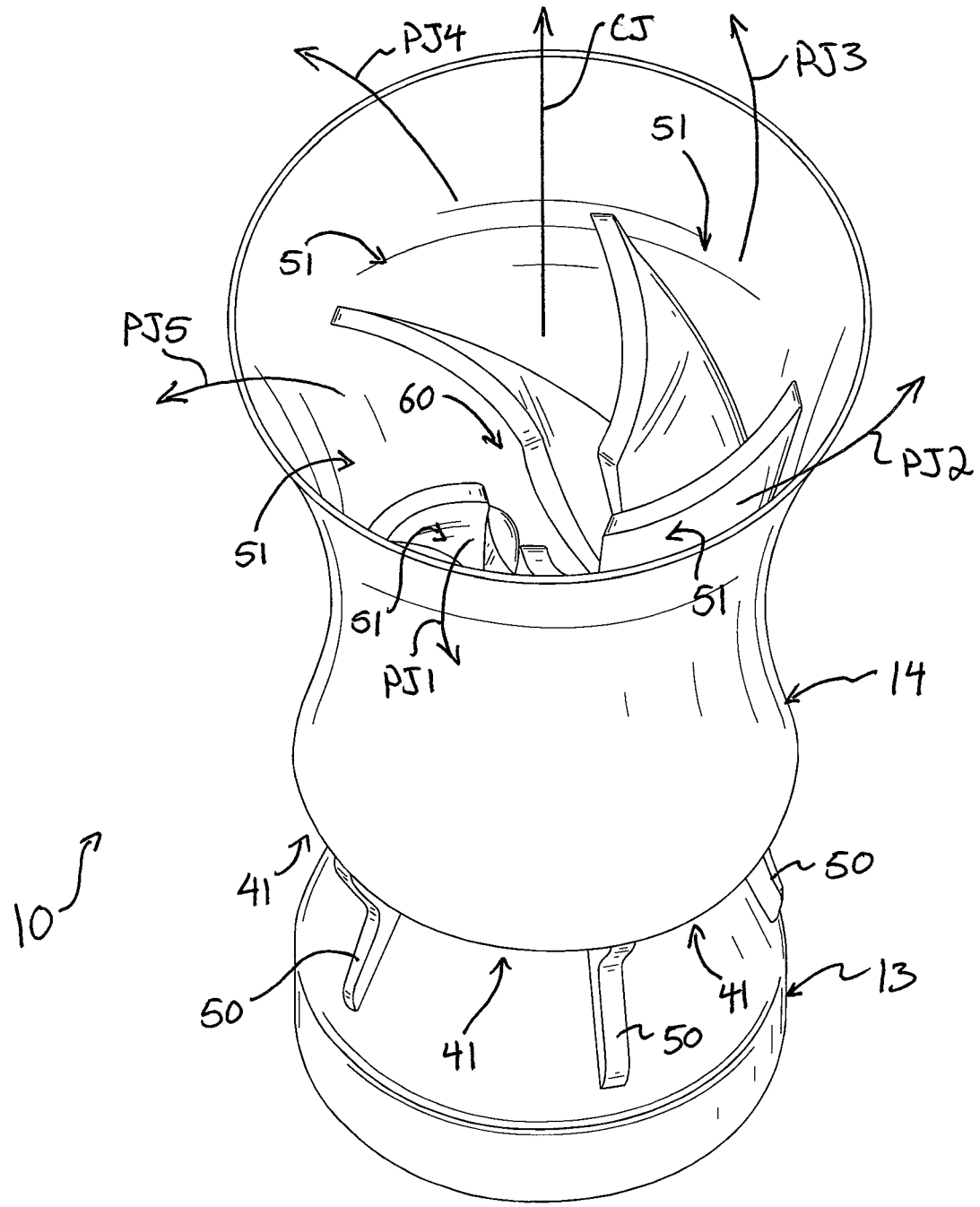
FIG. 11 is a top perspective view of the nozzle of FIG. 1.
Figure 12:
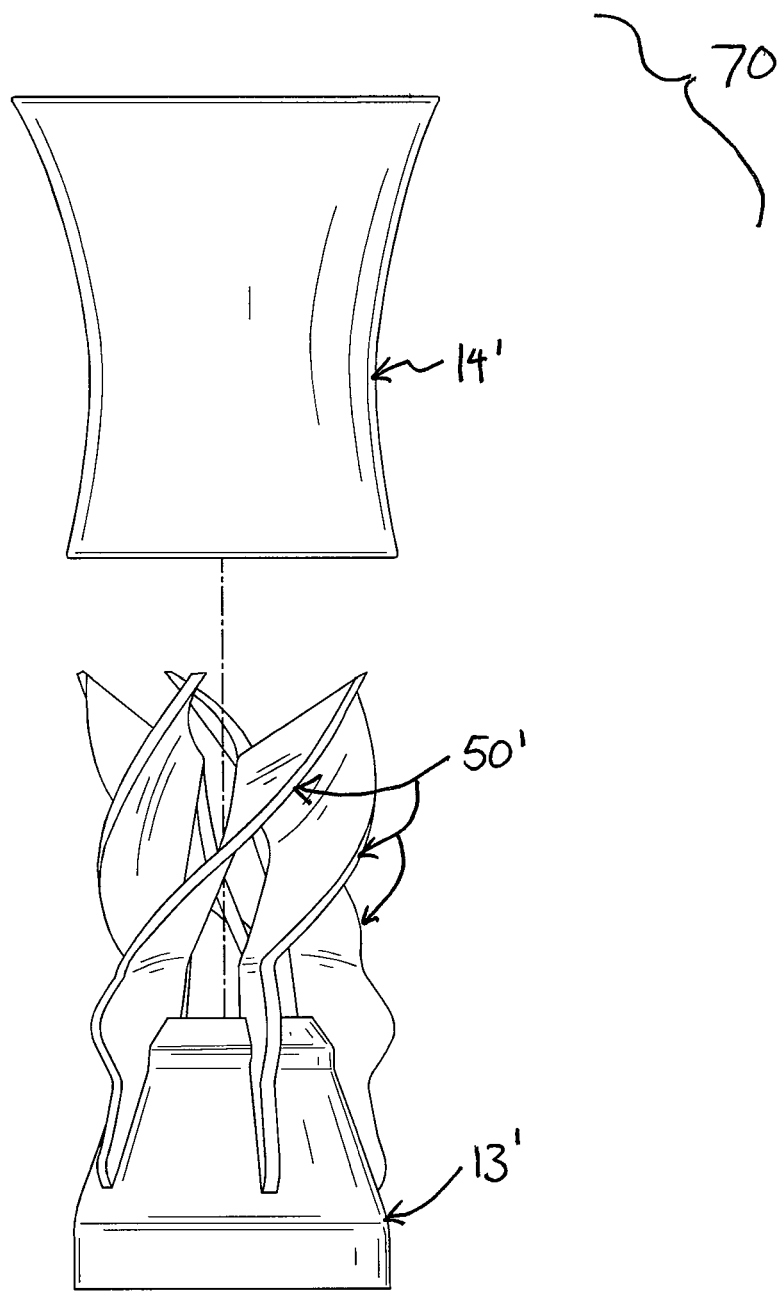
FIG. 12 is a side elevation view of another embodiment of a nozzle with a random discharge jet pattern, wherein the bell is separate from the intake cone and vanes.

The bell 14 is fixed to the intake cone 13. In the embodiment shown in FIGS. 1-11, the bell 14 is formed integrally and monolithically to the intake cone 13 as a single piece. The nozzle 10 is preferably constructed from a material or combination of materials having material characteristics of durability and inertness in water, such as plastic, and is manufactured easily on three-dimensional printers. Briefly, FIG. 12 shows an alternate embodiment in which the bell and intake cone are separate pieces secured to each other, as will be described.

Figure 3:
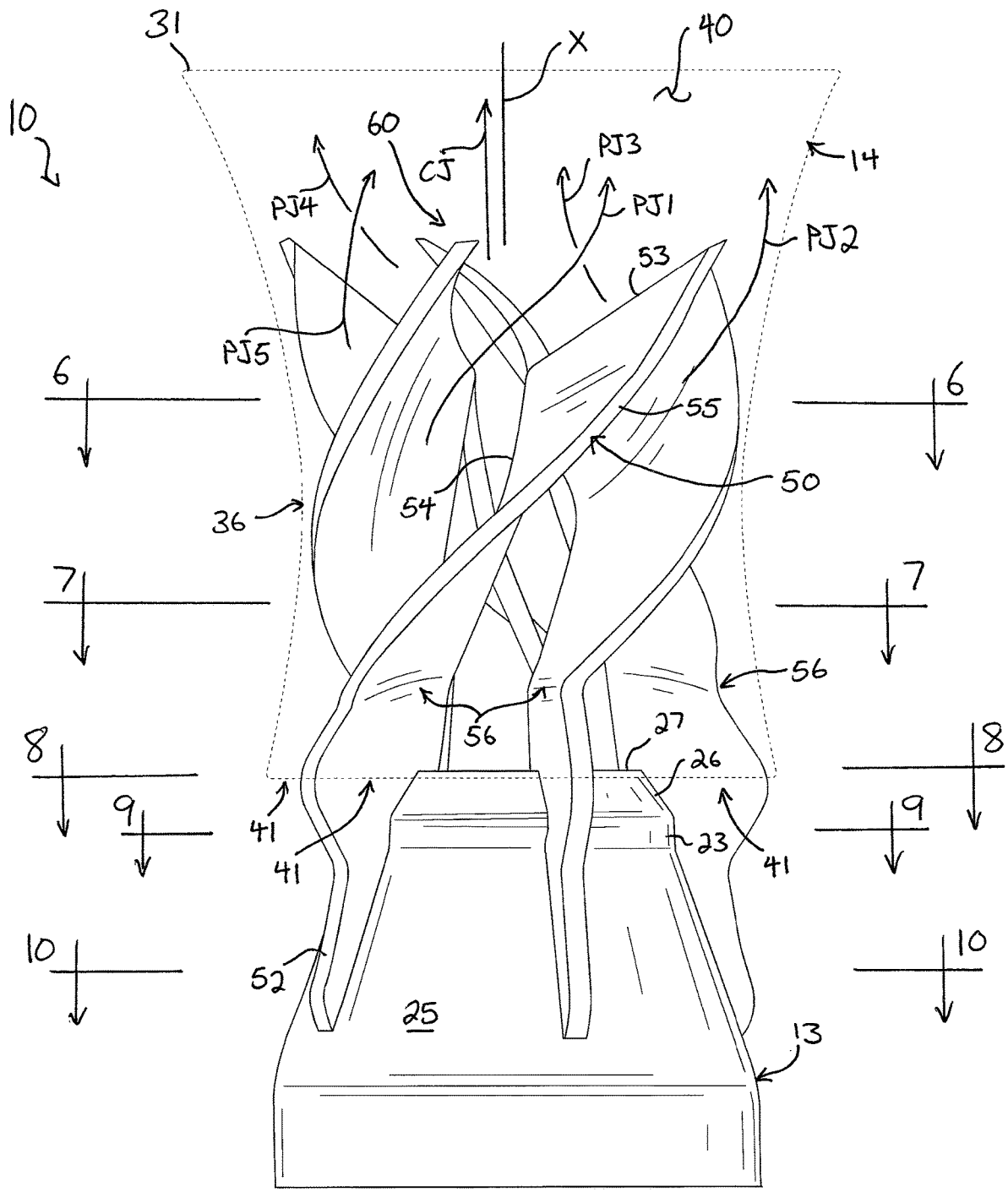
FIG. 3 is a side elevation view of the nozzle of FIG. 1, with the bell shown in broken line to illustrate the arrangement of the vanes.

Returning to FIGS. 1-11, and FIGS. 1 and 2 in particular, the bell 14 has an upstream end 30, an opposed downstream end 31, and a roughly cylindrical sidewall 32 extending therebetween. The upstream end 30 of the bell 14 bounds an opening 33 into the bell 14. The upstream end 30 of the bell 14 coaxially encircles the outlet 27 of the intake cone 13, such that the downstream end of the intake cone 13 is disposed within the opening 33 and encircled by the bell 14. Indeed, as seen in FIG. 3, the frustoconical portion of the outlet 27 is encircled by the upstream end 30 of the bell 14; it projects downstream from the upstream end 30 and the annular portion of the outlet 27 is just upstream from the upstream end 30. The opening 33 has a diameter D which is approximately equal to the diameter A and is approximately twice as large as the diameter C. With the outlet 27 disposed within the opening 33, the opening 33 actually as an annular space or annular entrance into the bell 14. Since the downstream end of the intake cone 13 is within the upstream end of the bell 14 and is slightly downstream therefrom, the upstream end of the bell 14 overlies and axially overlaps the downstream end of the intake cone 13. Access to the opening 33 is axial, along the outer surface 25 of the intake cone 13. In other words, environmental fluid must enter the opening 33 in an axial direction rather than a radial direction.

The bell 14 has opposed inner and outer surfaces 34 and 35. The sidewall 32 is relatively thin between the inner and outer surfaces 34 and 35 and has a constant thickness therebetween. The bell 14 has a hyperboloid shape and is thus concave cylindrical: the sidewall 32 of the bell 14 has a convergent portion proximate the upstream end 30 and a divergent portion proximate the downstream end 31, and the bell 14 has a diameter E (shown in FIG. 2) which decreases from the upstream end 30 to a general middle 36 of the bell 14 and then increases from the middle 36 to the downstream end 31.

From the opening 33 at the upstream end 30, the diameter E of the sidewall 32 decreases smoothly and parabolically to the middle 36 of the bell 14. At the middle 36, the diameter E of the bell 14 is a minimum, less than the diameters A and D but more than the diameters B and C. The diameter E of the bell 14 at the middle 36 is approximately seventy percent larger than the diameter C. The portion of the bell between the upstream end 30 and the middle 36 thus defines the convergent portion of the bell 14 because the sidewall 32 constricts.

The divergent portion of the bell 14 is defined by the portion of the bell from the middle 36 to the downstream end 31. Between these two locations, and in that downstream direction, the diameter E of the bell 14 increases smoothly and parabolically. At the downstream end 31, the bell 14—and the nozzle 10—has an outlet 40 through which all motive fluid moving through the nozzle 10 is communicated. At the outlet 40, the diameter E of the bell 14 is at a maximum, greater than the diameter E at the middle 36 and greater than the diameter E at the upstream end 30. Indeed, the diameter E is approximately two-and-a-half times larger than the diameter C at the outlet 27 of the intake cone 13.

Motive fluid moves through the bell 14 along the inner surface 34 thereof. The inner surface 34 is smooth, without bumps, indentation, sudden discontinuities, or other interruptions other than a plurality of vanes 50. These vanes 50 project from and couple the bell 14 to the intake cone 13, extending from the outer surface 25 of the intake cone 13 to the inner surface 34 of the bell 14. Only three of the vanes 50 are visible in FIGS. 1 and 2, but the nozzle 10 preferably has five vanes 50 as shown in the other drawings, especially FIGS. 5-10. The nozzle 10 is not so limited to only five vanes 50; other embodiments of the nozzle 10 may have fewer or greater numbers of vanes 50. Further, the number of vanes 50 in other embodiments of the nozzle 10 may be altered to accommodate different motive fluid flow rates expected for the nozzle 10.

Figure 4:
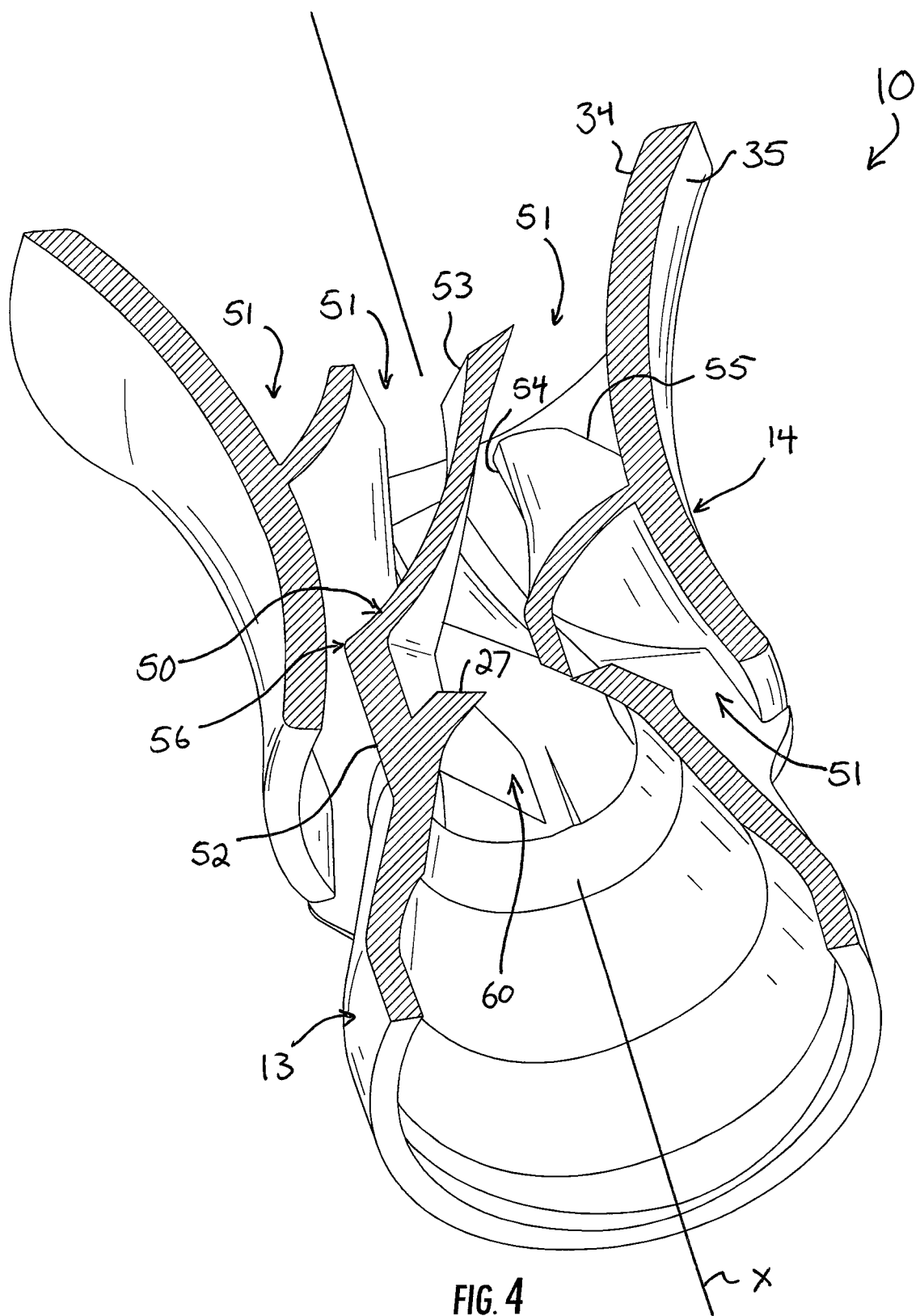
FIG. 4 is a section view of the nozzle taken along the line 4-4 in FIG. 1.
Figure 5:
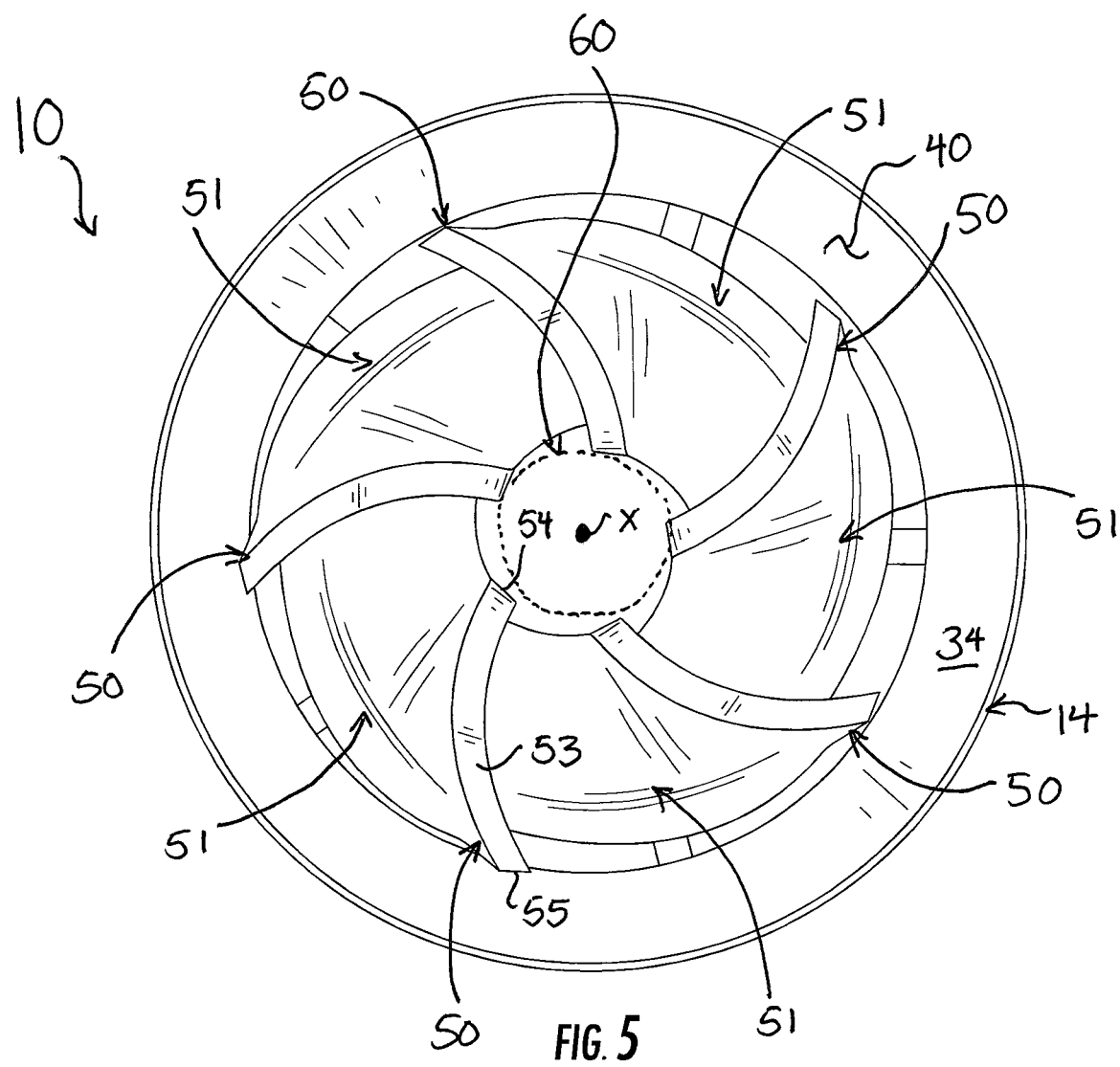
FIG. 5 is a plan view of the nozzle of FIG. 1 from downstream of the bell.
Figure 6:
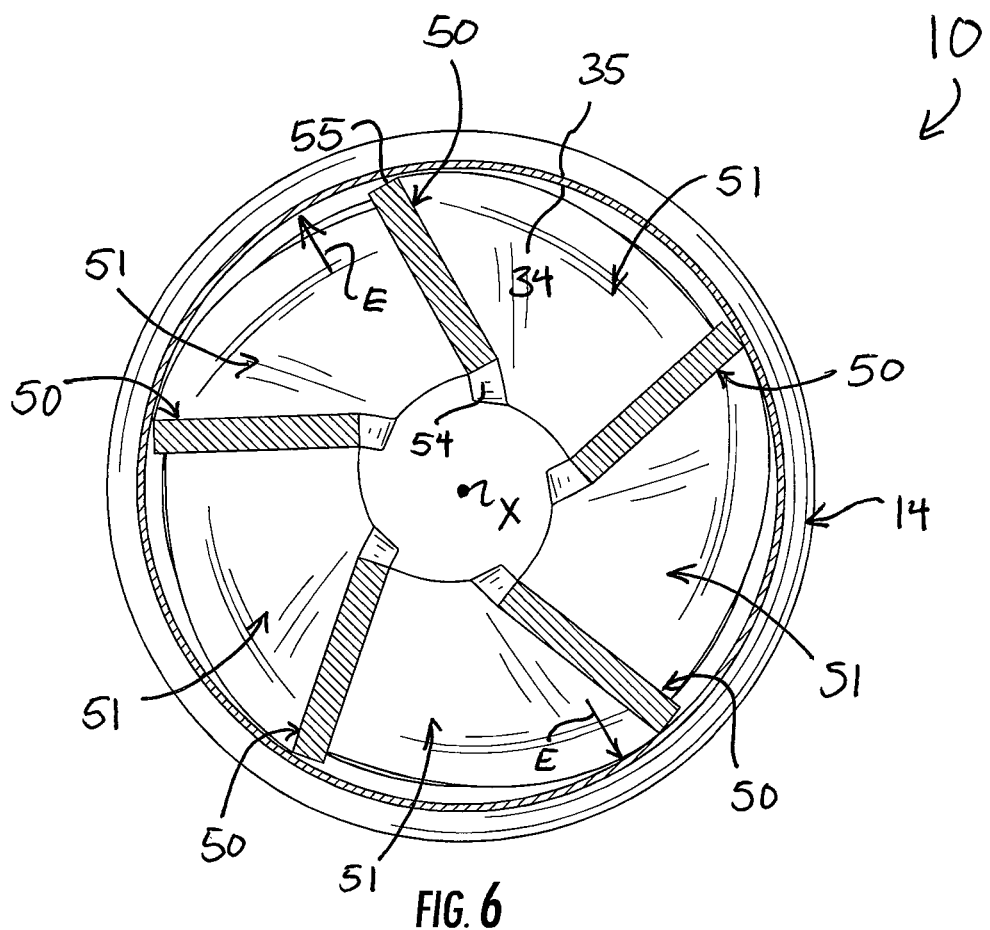
FIGS. 6, 7, 8, 9, and 10 are section views of the nozzle of FIG. 1 taken along the lines 6-6, 7-7, 8-8, 9-9, and 10-10, respectively, in FIG. 3, showing cross-sections of the nozzle along its length.
Figure 7:
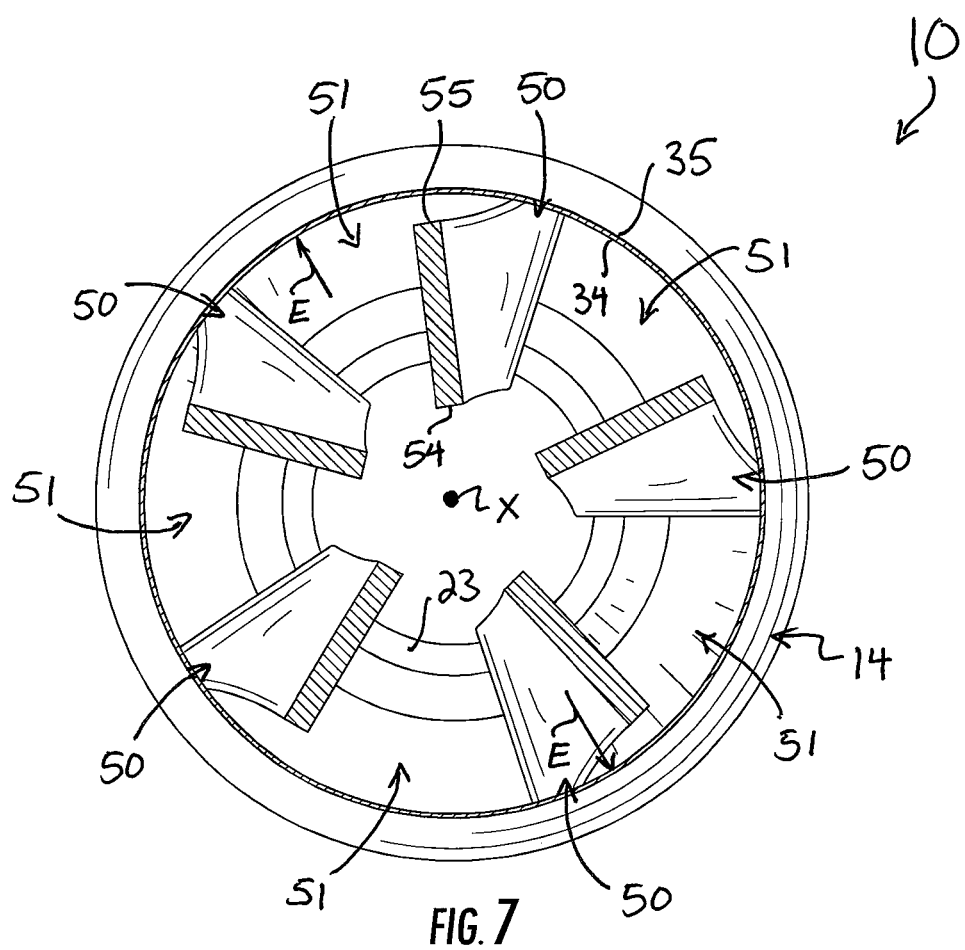
Figure 8:
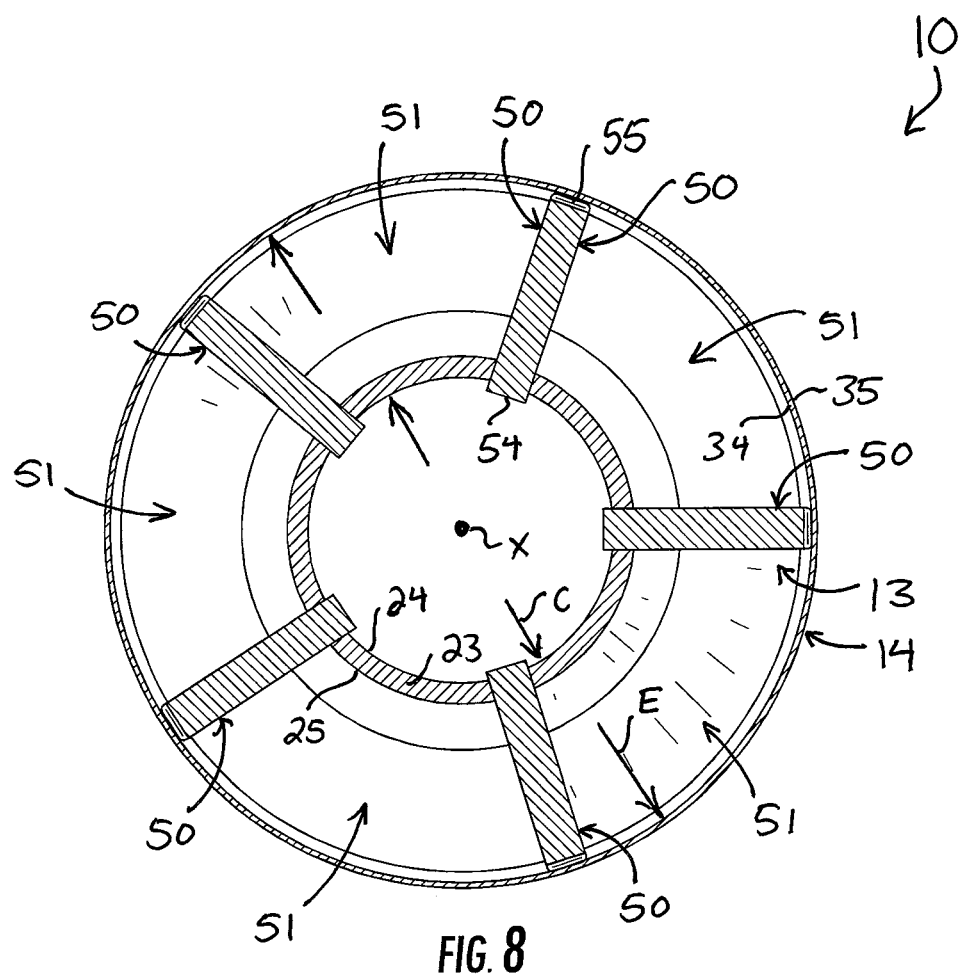

The vanes 50 are all spaced circumferentially apart from each other; they thus sever the annular opening 33 into separate entrance ports 41, each of which is an arcuate portion or wedge of the opening 33. Environmental fluid is suctioned through the ports 41 when motive fluid is communicated through the open inlet 21 of the intake cone 13. Together with the inner surface 34, the vanes 50 define helical channels 51 that direct separate jets of motive fluid through the nozzle 10. The channels 51 are best seen in FIGS. 4 and 5. Each channel 51 is bound on the outside by the inner surface 34 and bound on opposing sides by two adjacent or neighboring vanes 50. The inner side of each channel 51—the side directed radially inward toward the longitudinal axis X—is open. Each channel 51 extends along the inner surface 34 of the bell 14 from the upstream end 30 toward the downstream end 31.

Each of the vanes 50 is identical except in location, and only a single vane 50 will be referred to in detail. As such, one having ordinary skill in the art will readily appreciate that the ensuing description of the vane 50 applies equally to the other vanes 50, unless otherwise stated. In some cases, the description will refer to structural elements and features of other vanes 50 if the particular view in the drawing is clearer with respect to that vane 50. FIG. 3 shows the nozzle 10 in a side elevation view, with the outline of the bell 14 shown in broken line so that the vanes 50 are revealed. FIG. 4 shows a section view taken along the line 4-4 in FIG. 1 and illustrates the full length of one vane 50 projecting downstream from the intake cone 13.

The vane 50 has an upstream end 52, an opposed downstream end 53, and inner and outer edges 54 and 55 extending entirely along the length of the vane 50 from the upstream end 52 to the downstream end 53. The upstream end 52 of the vane 50 is located on the outer surface 25 of the intake cone 13; the downstream end of the vane 50 is located on the inner surface 34 of the bell 14, approximately halfway between the middle 36 of the bell 14 and the downstream end 31 of the bell 14.

Figure 9:
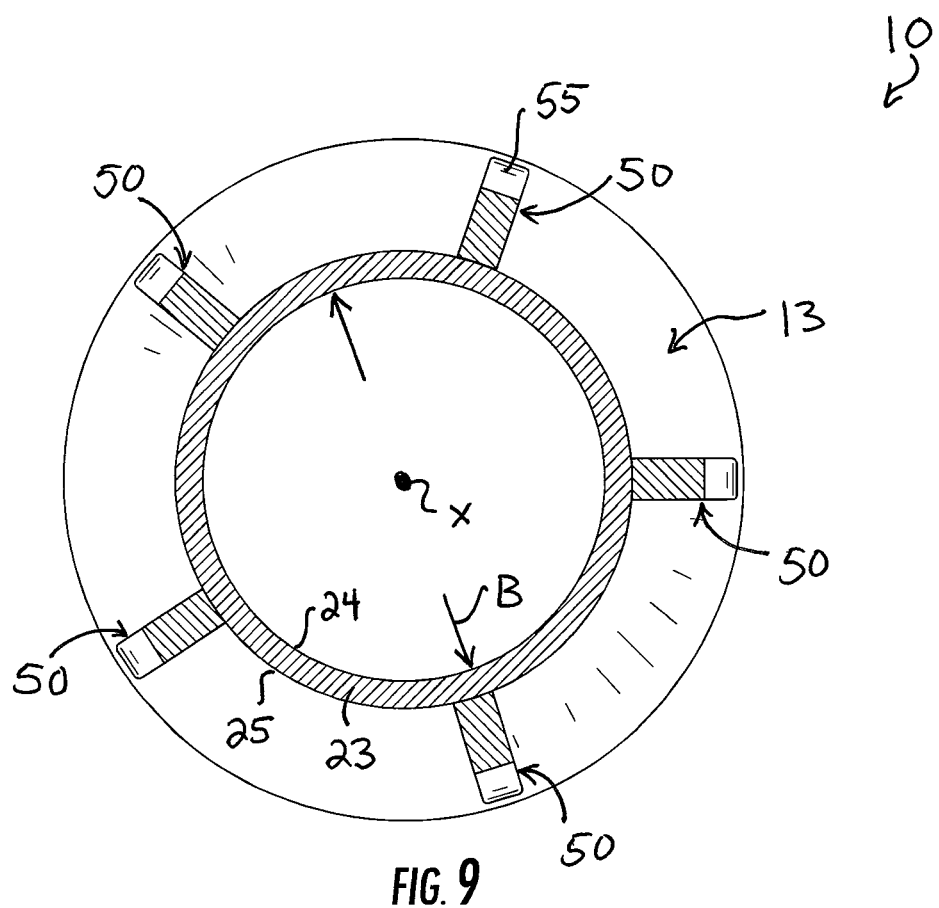
Figure 10:
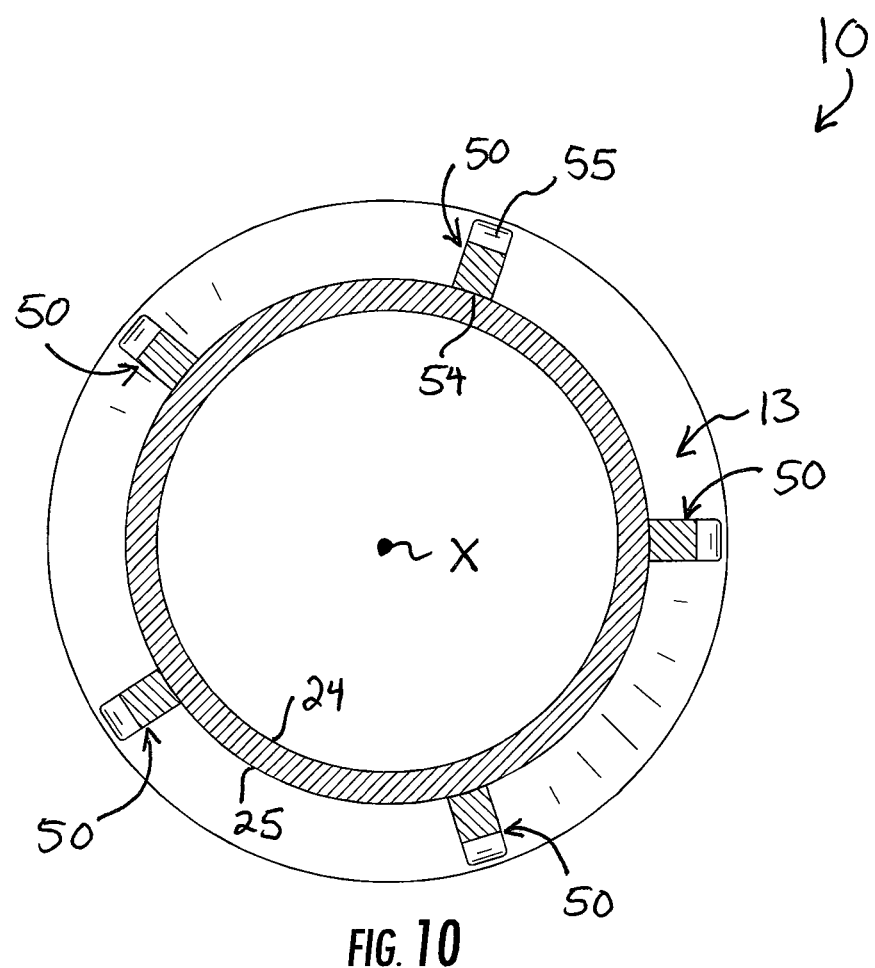

As shown in FIGS. 3, 4, and 8-10, the inner edge 54 of the vane 50 is directed radially inward, toward the longitudinal axis X of the nozzle 10. At the upstream end 52 of the vane 50, the inner edge 54 is fixed to the outer surface 25 of the intake cone 13. While the inner edge 54 is in contact with and formed to the outer surface 25, the outer edge 55 is free of the intake cone 13 (FIGS. 9 and 10).

Throughout its length, the vane 50 has an orientation with respect to the longitudinal axis X from the inner edge 54 to the outer edge 55. Similarly, throughout its length, the vane 50 has an alignment with respect to the longitudinal axis X from the upstream end 52 to the downstream end 53. Proximate to its upstream end 52, the vane 50 has a radial orientation; along the intake cone 13, the vane 50 projects normal to the outer surface 25 thereof. Moreover, proximate to its upstream end 52, the vane 50 has a parallel orientation; along the outer surface 25 of the intake cone 13, the vane 50 is aligned directly downstream, such that the length of the vane 50 there is aligned parallel with respect to the longitudinal axis X toward the outlet 40 of the bell 14.

A seen in FIGS. 3, 4, and 8-10, the vane 50 maintains this orientation and alignment across the entire outer surface 25 of the intake cone 13 and slightly downstream from the outlet 27 thereof. At an inflection point 56 in the vane 50 (shown best in FIGS. 3 and 4), however, the alignment and orientation change. The inflection point 56 is located just downstream of the opening 33 of the bell 14. There, the vane 50 begins wrapping helically along and around the inner surface 34 of the bell 14. When viewed from a top-down perspective through the outlet 40 (as in FIG. 5), the vane 50 wraps in a counter-clockwise direction around the inner surface 34; from its upstream end 52 to its downstream end 53, the vane 50 extends in a counter-clockwise direction. In other embodiments, the vanes 50 extend in a clockwise direction.

Downstream from the inflection point 56, the orientation and alignment of the vane 50 change. As shown in FIGS. 3, 4, 6, and 7, downstream from the inflection point 56, the vane 50 has a skewed orientation with respect to the longitudinal axis X; rather than projecting normal to the longitudinal axis X, it now projects in a direction other than normal. Moreover, downstream from the inflection point 56, the vane 50 is aligned helically with respect to the longitudinal axis X; rather than being aligned parallel to the longitudinal axis X, the vane 50 now wraps around the longitudinal axis X.

Indeed, the upstream and downstream ends 52 and 53 of the vane 50 are circumferentially offset by approximately ninety degrees. Thus, the vane 50 wraps around approximately ninety degrees of the inner surface 34 from the upstream end 30 toward the downstream end 31. The outer edge 55 of the vane 50 extends continuously along and in contact with the inner surface 34 of the bell 14, contracting and then expanding with the changing diameter E of the bell 14. The inner edge 54 of the vane 50, however, is free of the bell 14, and terminates at a generally constant radial distance from the longitudinal axis X along the entire length of the vane 50.

Since all the vanes 50 are identical, all the vanes 50 have inner edges 54, each of which terminates at the same radial distance from the longitudinal axis X, which is generally constant along each of the entireties of the inner edges 54. As seen in FIGS. 3-5, the inner edges 54 of the vanes 50 cooperate to bound and encircle a cylindrical central column 60 extending through the bell 14, coaxial to the axis X. The circular cross-section of the central column 60 is shown in broken line in FIG. 5. The inner edges 54 of the vanes 50 wrap helically around the central column 60, thereby further defining it. Each inner edge 54 cooperates with the inner edges 54 of the other vanes 50 to define, at any given cross-section of the nozzle 10, five points equidistant from the longitudinal axis X which bound the central column 60. Moreover, each inner edge 54 itself bounds a quarter-turn of the central column 60 in a direction parallel to the longitudinal axis X as the respective vane 50 helically wraps around the central column 60.

The diameter of the central column 60 is equal to the diameter C of the outlet 27 of the intake cone 13. As such, initially, the vast majority of motive fluid communicated through the intake cone 13 and through the outlet 27 moves through the bell 14 tightly and centrally in the central column 60, without entering into the channels 51. Water moving through this central column 60 is identified as the "central jet," and is illustrated and identified in FIGS. 3 and 11 with the reference character "CJ." There is a subsequent influence and interaction between motive fluid moving through the central column 60 and environmental fluid pulled in through the ports 41 which then becomes motive fluid moving through the channels 51 (hereinafter identified as "peripheral jets" and with reference characters "PJ1," "PJ2," "PJ3," "PJ4," and "PJ5" in FIG. 3).

In operation, motive fluid is pumped through the aquarium's circulation system. The nozzle 10 is pre-fit onto the discharge end of the circulation system and is submerged entirely underwater, so that the nozzle is surrounded by environmental water. From the circulation system, motive fluid enters the intake cone 13 where it is constricted by the decreasing diameter of the intake cone 13, creating an increase in velocity and a decrease in pressure of the motive fluid. This pressure decrease is relative to the environmental fluid in which the nozzle 10 is disposed; the pressure at the outlet 27 of the intake cone 13, and just downstream thereof, is lower than that of the environmental fluid. As such, environmental fluid is drawn into the nozzle 10 through the several ports 41.

The motive fluid, moving quickly, is expelled by the central jet CJ through the bell 14 of the nozzle 10. The central jet CJ has a cylindrical boundary layer between the fast-moving motive fluid and the slower environmental fluid. Around the central jet CJ, the peripheral jets PJ1-PJ5 are also expelling fluid through the nozzle 10. The fluid drawn into each port 41 is accelerated by the low-pressure suction of the motive fluid; it moves quickly into each channel 51 corresponding to a port 41. The helically-oriented channels 51 cause the drawn-in motive fluid to move downstream, spiral a quarter-turn within the bell 14, and then exit through the outlet 40 of the bell 14. When the motive fluid exits in this way, the peripheral jets PJ1-PJ5 are separate; the vanes 50 define the channels 51 which separate and isolate the peripheral jets from each other. As such, FIGS. 3 and 11 illustrate each peripheral jet PJ1-PJ5 as a discrete, separate flow of motive fluid out of the bell 14.

These five peripheral jets PJ1-PJ5 do remain separate and distinct, and do not affect each other. However, slight disturbances and changes in pressure and turbulence in an around the ports 41 and the peripheral jets PJ1-PJ5 cause the central jet CJ to move and deviate from its axial orientation shown in FIGS. 3 and 11. Even a slight drop in pressure will cause the central jet CJ to bend or move toward the channel 51 corresponding to the drop in pressure. A portion of the motive fluid moving in the central jet CJ now moves into the channel. However, shortly thereafter, a different turbulence or change will cause a different pressure drop at one of the other ports 41. This causes the motive fluid in the central jet CJ to move toward the channel 51 corresponding to the different drop in pressure. In other words, once the motive fluid begins moving through the nozzle 10, the central jet CJ actually snaps toward and into each of the peripheral jets PJ1-PJ5. The orientation of the central jet CJ is altered momentarily before it changes again, moving proximate to another of the peripheral jets PJ1-PJ5, and then another, and another, and so on. At higher flow rates, the orientation of the central jet CJ cycles more quickly toward each of the peripheral jets PJ1-PJ5, while at lower flow rates, the orientation of the central jet CJ cycles more slowly toward each of the peripheral jets PJ1-PJ5. For example, at some high flow rates, the central jet CJ will change orientation within a few seconds to perhaps less than a second. At some low flow raters, the central jet CJ may only change its orientation every thirty to sixty seconds. The flow rate is in part determined by the size of the nozzle 10 (differently-sized nozzles 10 accommodate different flow rates), but the flow rate for any particularly-sized nozzle 10 can still be altered within a wide range to affect the cycle time.

For example, when the circulation system is started, motive fluid moves through the nozzle 10 and out the central jet CJ, and environmental fluid is suctioned into the ports 41 of the nozzle 10 and moves out through the peripheral jets PJ1-PJ5. Then, the orientation of the central jet CJ will change, such as by moving toward the peripheral jet PJ3, for example, and actually moving at least partially into the channel 51 of peripheral jet PJ3. This change can be caused by a change in environmental fluid pressure and turbulence at the ports 41; such changes cause one port 41 to be dominant and flow through the peripheral jet corresponding to that port 41 increases, thereby pulling the central jet CJ over, until another port 41 becomes dominant because of subsequent changes in environmental fluid pressure and turbulence.

Indeed, the central jet CJ will maintain this orientation for a period of time, until a change in pressure and turbulence occurs within the nozzle 10 and causes the central CJ to change its orientation, moving to perhaps the peripheral jet PJ1, for example. Again, the central jet CJ will maintain this new orientation for a period of time, until another change in pressure and turbulence occurs within the nozzle 10 and causes the central jet CJ to change its orientation again, moving to perhaps the peripheral jet PJ4, for example. This continues over and over, with the central jet CJ moving its orientation. Of course, each time the orientation of the central jet CJ is altered, motive fluid is directed in a new way throughout the environment. Therefore, the fluid in the aquarium is constantly being disturbed in a random fashion. This creates a random flow of fluid within the aquarium.

As mentioned above, FIG. 12 shows an alternate embodiment of a nozzle with a random discharge jet pattern, identified with the reference character 70. The nozzle 70 is nearly identical to the nozzle 70. In fact, it includes every single structural element and feature that the nozzle 10 does, in the same location and arrangement as in the nozzle 10.

As such, the same reference characters of the nozzle 10 are used to identify the same structural elements and features of the nozzle 70, but are marked with a prime {"'"} symbol so as to differentiate them from those of the nozzle 10. Unlike the nozzle 10, the bell 14' is not formed integrally and monolithically to the intake cone 13' as a single piece. Rather, the bell 14' is a separate piece from the intake cone 13'. The intake cone 13' and vanes 50' are a single, integral, monolithic piece, but the bell 14' is separate and must be fixed to them.

A preferred embodiment is fully and clearly described above so as to enable one having skill in the art to understand, make, and use the same. Those skilled in the art will recognize that modifications may be made to the description above without departing from the spirit of the invention, and that some embodiments include only those elements and features described, or a subset thereof. To the extent that modifications do not depart from the spirit of the invention, they are intended to be included within the scope thereof.

The invention claimed is:

1. A nozzle comprising:
    an intake cone having an upstream end, a downstream end, an outer surface, and an open inlet at the upstream end in communication with an open outlet at the downstream end, wherein the intake cone is frusto-conical and wider at the upstream end than at the downstream end;
    a bell having an upstream end, a downstream end, and an inner surface, wherein the bell s fixed to the intake cone so that the upstream end of the bell encircles the downstream end of the intake cone, and the bell is concave cylindrical, having a diameter which decreases from the upstream end of the bell to a middle of the bell and then increases from the middle to the downstream end of the bell; and vanes project from the bell to the intake cone, wherein the vanes extend from the outer surface of the intake cone to the inner surface of the bell and then along the inner surface of the bell toward the downstream end thereof;

wherein the vanes define a plurality of channels extending along the inner surface of the bell from the upstream end toward the downstream end thereof.

2. The nozzle of claim 1, wherein the vanes wrap helically along the inner surface of the bell from the upstream end toward the downstream end thereof.

3. The nozzle of claim 1, wherein the vanes bound a central column extending coaxially through the bell.

4. The nozzle of claim 1, wherein:
the vanes each have an upstream end and a downstream end; and
the downstream end of each vane terminates between the middle of the bell and the downstream end of the bell.

5. The nozzle of claim 1, wherein the upstream and downstream ends of the vanes are circumferentially offset by approximately ninety degrees.

6. The nozzle of claim 1, wherein:
from the upstream end of the bell toward the middle of the bell, each vane is oriented radially inward from the inner surface of the bell; and
from the middle of the bell toward the downstream end of the bell, each vane is oriented in a skewed orientation with respect to the inner surface of the bell.

7. The nozzle of claim 1, further comprising:
a longitudinal axis extending coaxially through the intake cone and the bell;
each vane has an orientation with respect to the longitudinal axis, the orientation being one of radial or skewed;
each vane has an alignment with respect to the longitudinal axis, the alignment being one of parallel or helical; and
along the longitudinal axis, the orientation of each vane changes from radial to skewed when the alignment of the respective vane changes from parallel to helical.

8. A nozzle comprising:
an intake cone having an upstream end, a downstream end, an outer surface, and a open inlet at the upstream end in communication with an open outlet at the downstream end, wherein the intake cone is frusto-conical and wider at the upstream end than at the downstream end;
a bell having an upstream end, a downstream end, and an inner surface, wherein the bell is fixed to the intake cone so that the upstream end of the bell encircles the downstream end of the intake cone, and the bell is concave cylindrical, having a diameter which decreases from the upstream end of the bell to a middle of the bell and then increases from the middle to the downstream end of the bell; and
vanes projecting from the bell to the intake cone, wherein the vanes extend from the outer surface of the intake cone to the inner surface of the bell;
wherein the vanes wrap helically along the inner surface of the bell from the upstream end toward the downstream end thereof.

9. The nozzle of claim 8, further comprising:
a longitudinal axis extending coaxially through the intake cone and the bell; and
upstream from the vanes wrapping helically, the vanes extend from the outer surface of the intake cone to the inner surface of the bell in an alignment which is parallel to the longitudinal axis.

10. The nozzle of claim 8, wherein the vanes define a plurality of channels extending along the inner surface of the bell from the upstream end toward the downstream end thereof.

11. The nozzle of claim 8, wherein the vanes bound a central column extending coaxially through the bell.

12. The nozzle of claim 8, wherein:
the vanes each have an upstream end and a downstream end; and
the downstream end of each vane terminates between the middle of the bell and the downstream end of the bell.

13. The nozzle of claim 8, wherein the upstream and downstream ends of the vanes are circumferentially offset by approximately ninety degrees.

14. The nozzle of claim 8, wherein:
from the upstream end of the bell toward the middle of the bell, each vane is oriented radially inward from the inner surface of the bell; and
from the middle of the bell toward the downstream end of the bell, each vane is oriented in a skewed orientation with respect to the inner surface of the bell.

15. The nozzle of claim 8, further comprising:
a longitudinal axis extending coaxially through the intake cone and the bell;
each vane has an orientation with respect to the longitudinal axis, the orientation being one of radial or skewed;
each vane has an alignment with respect to the longitudinal axis, the alignment being one of parallel or helical; and
along the longitudinal axis, the orientation of each vane changes from radial to skewed when the alignment of the respective vane changes from parallel to helical.

16. A nozzle comprising:
an intake cone having an upstream end, a downstream end, an outer surface, and a open inlet at the upstream end in communication with an open outlet at the downstream end, wherein the intake cone is frusto-conical and wider at the upstream end than at the downstream end;
a bell having an upstream end, a downstream end, and an inner surface, wherein the bell is fixed to the intake cone so that the upstream end of the bell encircles the downstream end of the intake cone, and the bell is concave cylindrical, having a diameter which decreases from the upstream end to a middle of the bell and then increases from the middle to the downstream end of the bell;
vanes projecting from the bell to the intake cone, wherein the vanes extend from the outer surface of the intake cone to the inner surface of the bell;
wherein the vanes define a plurality of channels extending along the inner surface of the bell from the upstream end toward the downstream end thereof, and the vanes bound a central column extending coaxially through the bell.

17. The nozzle of claim 16, wherein the vanes wrap helically along the inner surface of the bell from the upstream end toward the downstream end thereof.

18. The nozzle of claim 16, wherein:
the vanes each have an upstream end and a downstream end; and
the downstream end of each vane terminates between the middle of the bell and the downstream end of the bell.

19. The nozzle of claim 16, wherein the upstream and downstream ends of the vanes are circumferentially offset by approximately ninety degrees.

20. The nozzle of claim 16, wherein:

from the upstream end of the bell toward the middle of the bell, each vane is oriented radially inward from the inner surface of the bell; and from the middle of the bell toward the downstream end of the bell, each vane is oriented in a skewed orientation with respect to the inner surface of the bell.

21. The nozzle of claim 16, further comprising:

a longitudinal axis extending coaxially through the intake cone and the bell;

each vane has an orientation with respect to the longitudinal axis, the orientation being one of radial or skewed;

each vane has an alignment with respect to the longitudinal axis, the alignment being one of parallel or helical; and along the longitudinal axis, the orientation of each vane changes from radial to skewed when the alignment of the respective vane changes from parallel to helical.

* * * * *